May 17, 1955

A. E. ANDERSON 2,708,720

TRANSISTOR TRIGGER CIRCUIT

Filed June 7, 1950

INVENTOR
A. E. ANDERSON
BY Harry C. Hart
ATTORNEY

United States Patent Office 2,708,720

Patented May 17, 1955

2,708,720

TRANSISTOR TRIGGER CIRCUIT

Alva Eugene Anderson, Mountainside, N. J., assignor to Bell Telephone Laboratories, Incorporated, New York, N. Y., a corporation of New York Application June 7, 1950, Serial No. 166,733

12 Claims. (Cl. 250—36)

This invention relates to transistor trigger circuits and has for its general object the achievement of performance and operation of such circuits which shall be uniform, reliable, and rapid under all conditions to be met within practice.

A particular object of the invention is to render such a circuit independent of the temperature and of peculiarities of the individual transistor which serves as its active element. A related object is to improve the response of such a trigger circuit to the pulses which operate to trip it.

Transistor trigger circuits may be of several varieties. One group of such circuits employs as its central element a current-multiplication transistor as described, for example, in an article by R. M. Ryder and R. J. Kircher published in the Bell System Technical Journal for July 1949 at page 367 (vol. 28). Of this group, a circuit to which the present invention is especially applicable comprises a current-multiplication transistor to which there is connected an external network including a source of operating potential for the collector, a feedback-promoting resistor in series with the base, a "load line" resistor, and, in a preferred embodiment, a condenser connected to the emitter. The current-voltage characteristic of the transistor and its base resistor, taken together, has a central negative resistance part bounded on either side by positive resistance parts, with which the negative resistance part is continuous. The system is monostable, astable, or bistable, depending on whether the load line, i. e., the characteristic of the resistor externally connected to the emitter, intersects the transistor characteristic in one of its positive resistance parts, in its negative resistance part, or in all three. Such a system is described in "A Transistor Trigger Circuit" by H. J. Reich and R. L. Ungvary, published in the Review of Scientific Instruments for August 1949 at page 586 (vol. 20). The system, as well as others, is described in an application of A. J. Rack, Serial No. 79,861, filed March 5, 1949.

Operating experience with such a circuit has revealed that its behavior with one transistor may differ widely from its behavior with another; that with a particular transistor, it depends on the temperature; and that the frequency with which such circuits respond correctly to applied pulses is limited. The first two of these phenomena have been traced to differences among the transistor characteristics, and the third has been traced to the very high resistance which the emitter contact manifests in its reverse conduction direction and through which the condenser must discharge.

The present invention overcomes these defects. In one aspect, by employing an external emitter resistor of very large magnitude, the first defect is overcome. In another aspect, an impedance element of intermediate value, for example, a resistor or a combination of a resistor and a rectifier, is connected between the emitter and the base. This effectively reduces the high reverse conduction resistance of the emitter contact during and only during those parts of the operating cycle in which this contact limits the speed of operation.

The invention will be fully apprehended from the following detailed description of preferred embodiments thereof, taken in connection with the appended drawings, in which.

Figure 1:
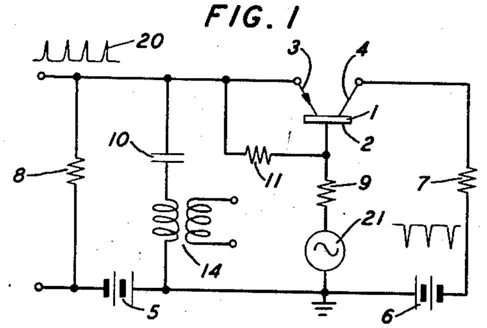
Fig. 1 is a schematic circuit diagram showing a transistor trigger circuit embodying the invention.
Figure 5:
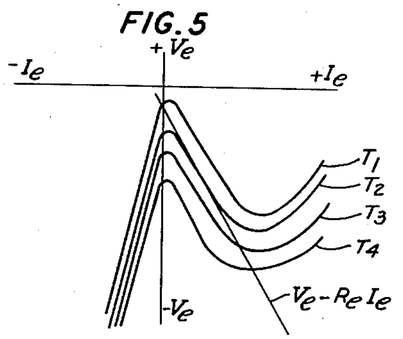
Figs. 5, 6, 7, and 8 are explanatory diagrams showing the current-voltage characteristic of a transistor trigger circuit for use in explaining the operation of the invention.

Referring now to the figures and especially to Figs. 1 and 5, Fig. 1 shows a transistor having a semi-conductive body 1 with which a base electrode 2 makes ohmic contact, while an emitter electrode 3 and a collector electrode 4 preferably make rectifier contact with the surface of the body. The emitter is biased as by a battery 5, about whose magnitude and polarity more will be said below. The collector 4 is biased as by a battery 6 for conduction in the reverse direction. A resistor 7, which may serve as an output load, or may be included merely to protect the collector contact from damage, is connected in the collector circuit, while a "load line" resistor 8 is connected to the emitter 3. A feedback-promoting resistor 9 is connected in series with the base electrode 2. The circuit is of the "grounded base" configuration by reason of the fact that the external base resistor 9 is common to the emitter circuit, which comprises the emitter electrode 3 and the base 2, and to the collector circuit, which comprises the collector electrode 4 and the base 2. The point at which these two circuit meshes come together may be grounded although, of course, this is not necessary. A condenser 10 is connected from the emitter 3 to ground.

Disregarding for the present the resistor 11, which is connected directly from the emitter 3 to the base 2, this circuit, except for the magnitude of the load line resistor 8 and the magnitude and sign of the bias battery 5, is as described in the A. J. Rack patent application and the Reich-Ungvary publication above referred to, and it is known that its emitter current-emitter voltage characteristic has the approximate form of the letter N as indicated by any one of the characteristic curves of Fig. 5, in which an intermediate negative resistance part is bounded at either end by a positive resistance part. It is also known that the left-hand or upper reflex point at which the left-hand branch of the curve changes from positive resistance to negative is quite sharp and lies very close to the zero current axis, i. e., the current at the peak is about 10–50 microamperes; that the lower reflex point of the curve, where the negative resistance part changes to the right-hand positive resistance branch is much less sharp; and that the left-hand positive resistance branch of the curve is much steeper than the right-hand branch.

Now it is a fact that there exists considerable variation among the characteristics of individual transistors but that this variation consists largely in a displacement upward or downward, in the coordinates of Fig. 5, of the characteristic as a whole. Thus, the upper curve of Fig. 5 represents the characteristic of one transistor, the lower curve represents the characteristic of another transistor, while the two intermediate curves represent the characteristics of a third transistor and of a fourth. It has also been discovered that the characteristic of any single transistor varies somewhat with temperature and that this variation is of the same sort; that is, if the characteristic of a particular transistor is as given by the upper curve of Fig. 5, then, as the temperature is raised, the characteristic is displaced downward in the coordinates of Fig. 5. Indeed, the variations with temperature and with transistor peculiarities are so great that the emitter voltage at the upper reflex point of the characteristic may lie anywhere in the range 2–20 volts negative. In this respect, the curves of Figs. 5 to 8 are not to scale.

It is explained in the A. J. Rack patent application above referred to that the operation of such a circuit depends on the intersection point of this N-shaped characteristic with a load line which in turn is the characteristic of the external resistor in the emitter circuit. Such a load line is plotted in Fig. 5, where the slope of the line is proportional to the magnitude of the external emitter resistor, and its intercept on the zero current axis is proportional to the potential of the emitter bias source 5 which, in the case of the load line shown on Fig. 5, is small and negative.

In Fig. 5, the load line intersects each of the several transistor characteristics in a different point, and the differences among these intersections are representative of widely different performances. Thus, the intersection with the uppermost characteristic is on a postiive resistance part of the characteristic so that operation with this transistor would be stable. However, it would be very close to instability so that a very small disturbance would cause the circuit to trip. The intersection with the lowermost characteristic is likewise on a positive resistance part and is, therefore, stable, but it represents an undesirable stability point because of the large emitter current which is drawn. The intersection with the second and third characteristics is in each case on the negative resistance portion of the curve and represents instability.

Evidently, if a circuit is constructed having specific values for the external resistors and bias sources, and the various transistors, whose characteristics are represented by the curves of Fig. 5, are connected in this circuit in turn, the first transistor may operate to the entire satisfaction of the user, while the second and third will oscillate, and the fourth may be objectionable on account of the large currents which its point of stable operation represents. It has thus been necessary in the past to choose the values of all the parameters of the external circuit to match the characteristic of the particular transistor employed and thereafter to maintain the temperature of the transistor fairly constant in order to avoid instability and to hold the operation to what is intended.

Now, reexamining the curves of Fig. 5 and especially their left-hand branches, it is seen that the vertical distance between the intersection point of any one of these branches with the zero current axis and the upper reflex point of the curve is very nearly constant from curve to curve. This feature has now been extensively observed and fully confirmed by experimental tests. Thus, if the zero current axis itself were the load line, the circuit would be stable with any one of the four transistors whose characteristics are shown in Fig. 5; and, furthermore, the required tripping voltage would be just about one-half volt in each case.

Figure 6:
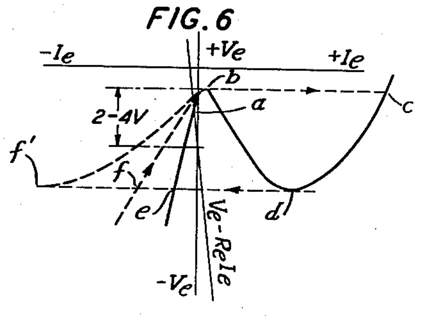

In accordance with the invention in one of its forms, this result is secured by utilizing the zero current axis as the load line; in other words, using a load resistor whose resistance is infinite. However, this entails guarding the circuit against unwanted perturbations or shocks of one-half volt or more, else unintended tripping takes place. Such precautions may not always be convenient, and they pose obvious limits to the ruggedness of the device. In accordance with a second aspect of the invention, therefore, a load line is employed which is very nearly parallel with the zero current axis but which, by adjustment of its intercept with this axis, may be displaced in either direction along the current axis. For sensitivity of the apparatus to tripping pulses of 2–4 volts or so and security against tripping by a smaller pulse, what is needed is a displacement of the load line to the left so that, while lying nearly parallel to the zero current axis, its intersection with the transistor characteristic is further removed from the upper reflex point or positive peak of this characteristic than is the intersection with the zero current axis. Such a condition is shown in Fig. 6, where the load line whose characteristic is shown intersects the transistor characteristic about six times as far from the positive peak as does the zero current axis. Thus, in this case, while a pulse of only one-half volt would operate to trip the circuit in the absence of any external load resistor at all, the load resistor shown renders the circuit insensitive to tripping pulses of less than 3 volts amplitude. By employment of a sufficiently large external resistor and a bias potential source 5 of sufficiently large negative potential, the slope of this load line may be kept as steep as may be desired, thus preserving the stability feature discussed above in connection with Fig. 5. Thus, in examples which have given excellent performance, an external load resistor of 1–10 megohms has been employed in combination with a bias potential source 5 of 50–150 volts negative.

As explained in the A. J. Rack application above referred to, the circuits may be tripped by the application of a positive pulse to the emitter or an equal negative pulse to the base 2. In Fig. 1, a train of positive input pulses are represented at 20, and a source 21 of negative pulses is included in the base lead.

Given that a transistor trigger circuit has been constructed of which the transistor characteristic is as represented by the N-shaped curve of Fig. 6, while the characteristic of the external emitter resistor with its battery 5 is as represented by the steeply sloping load line of the same figure, the system rests at current-voltage conditions represented by the intersection point *a* of these two curves. When a tripping pulse is applied sufficient to raise the emitter voltage above the upper reflex point *b* of the curve, the operating condition snaps along a constant voltage line to the right-hand branch of the characteristic curve, reaches this branch at the point *c*, travels downward along this branch to the lower reflex point *d*, snaps backward along another constant voltage line to the point *e* on the left-hand branch of the characteristic curve, and then returns along the left-hand branch to its stable starting point *a*. The total time required for the completion of this cycle of operation is the sum of the times to travel from *c* to *d* and of the time required to travel from *e* to *a*. Now, along the branch *c*—*d* of the characteristic curve, the emitter is operating in its forward conduction direction where its contact resistance is low, and this operation may take place very rapidly. The time required for this portion of the cycle is governed principally by the external circuit, including the condenser 10 and any series resistance, for example, that of the transformer 14, in conjunction with the transistor properties. However, during the part *e*—*a* of the cycle, the emitter is in its reverse conduction direction, and its resistance is very high. The condenser 10 has been charged, and it must discharge before the sable point *a* can be reached. Discharge of the condenser 10 through the parallel resistance of the high resistor 8 and of the high reverse resistance of the emitter contact 3 is necessarily slow, while, to accelerate this discharge by reducing the magnitude of the resistor 8 would defeat the original purpose of securing interchangeability of transistors by keeping the slope of the load line very steep.

In accordance with another aspect of the invention, therefore, a resistor 11 is connected directly between the base electrode 2 and the emitter electrode 3. Its resistance is preferably intermediate between the magnitude of the reverse resistance of the emitter contact represented by the slope of the branch *e*—*a* of the characteristic curve and the forward resistance of the emitter contact. In any event, it is several times as large as the resistance of the emitter contact in its forward direction, approximately represented by the slope of the branch *c*—*d*. In round numbers, the magnitude of this resistor 11 may be 4000–50,000 ohms. Therefore, when the emitter is in its forward conduction direction, this new resistor 11 is of little effect, while when the emitter is in its reverse conduction direction, its high contact resistance is shunted by the lower resistance of the resistor 11 so that, in effect, the branch *e—a* of the characteristic curve of Fig. 6 is replaced by a branch *f—a* whose slope is much less steep. When the resistor 11 is connected as shown, the operating point, having snapped from point *b* to point *c*, travels rapidly to point *d*, now snaps to point *f* instead of to point *e*, and it can return much more rapidly from the point *f* to the point *a* than it can from the point *e* to the point *a*. As a result, the total time required for completion of the cycle has been reduced by as much as ten to one.

Useful power may be taken from the device either in the form of the pulse of collector current flowing through a load resistor 7 or by utilizing the pulse of current which charges the condenser 10. This condenser charging current may conveniently be utilized as a source of output power by including in series with the condenser 10 a relay or other load, represented by a transformer 14.

Figure 2:
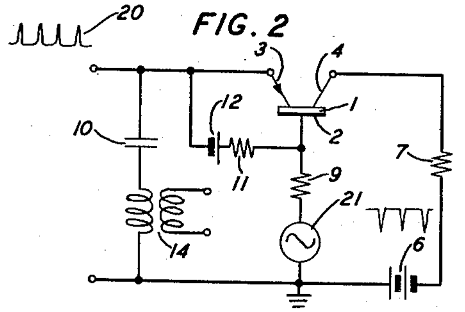
Figs. 2 and 3 are schematic circuit diagrams showing alternatives to the circuit of Fig. 1.
Figure 7:
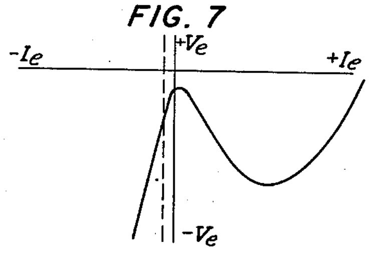

Instead of using an external resistor 8 of very high resistance and a bias battery 5 of correspondingly high potential to produce a very steep load line as indicated in Fig. 6, the system may be made insensitive to spurious perturbing pulses by effectively moving the zero current axis to the left, as illustrated in Fig. 7. As shown in Fig. 2, this may be accomplished practically by including a small bias battery 12 in series with the discharge resistor 11. Such an arrangement results in economy of apparatus by elimination of the resistor 8 and, particularly by elimination of the large battery 5. However, it involves the difficulty that both terminals of the battery are off ground. Therefore, the circuit arrangement of Fig. 1 is preferred as a practical matter.

Figure 3:
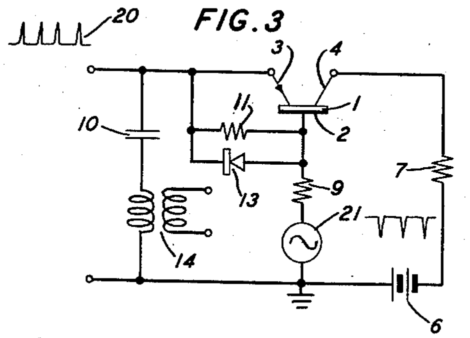

As explained above, the magnitude of the resistor 11 should be intermediate between the forward and reverse contact resistances of the emitter contact 3 in order that it shall effect a substantial reduction in the resistance through which the condenser 10 discharges without seriously affecting the lower resistance through which it is charged. This result can be extended and accentuated by providing between the emitter contact 3 and the base electrode 2 an impedance element which is somewhat more refined than a mere ohmic resistor and whose effective impedance differs appropriately at the different parts of the operating cycle. Thus, Fig. 3 shows the combination of the resistor 11 and a rectifier 13 connected in parallel with it. In action, the rectifier 13 presents very low series charging resistance during the recovery portion of the cycle and then becomes a high impedance and remains such throughout the remainder of the cycle of operation. Thus, in effect, the point *f* is shifted to the left in Fig. 6, e. g., to the point *f'*, and the condenser-discharge now takes place along the path *f'—a*, whose resistance is correspondingly reduced. In Fig. 3, the rectifier 13 may be regarded as the controlling element, while the resistor 11 now plays a subordinate role of merely limiting the maximum resistance of the combination 11—13.

As mentioned above, a monostable system results when the intersection point of the transistor characteristic and of the load line is on the left-hand positive resistance portion of the characteristic, while an intersection on the negative resistance portion represents instability. It is explained in the A. J. Rack patent application above referred to that with an unstable intersection point, such as the point *g* of Fig. 8, operation as a multivibrator results. The system behaves as though it were always seeking to settle down at the point *g*, but since this point is unstable, operation takes place cyclically, the operating point traveling around the path *b—c—d—e*, repeatedly. In this system, the upper frequency of cyclic operation is limited by the discharge time of the condenser 10 which in turn is limited, as described above, by the high reverse conduction contact resistance of the emitter contact 3. In accordance with the invention, steady state cyclic operation as with a multivibrator can be caused to take place at a much higher frequency by the inclusion of the resistor 11, the rectifier 13, or both. Cyclic operation now takes place over the path *b—c—d—f* or *b—c—d—f'*.

Figure 8:
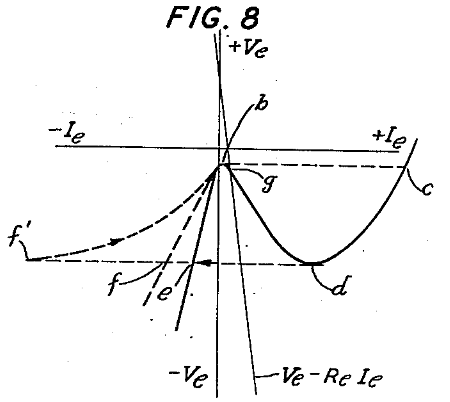

For such cyclic operation, it is, of course, necessary that the load line intersect the characteristic on the negative resistance portion and only on the negative resistance portion. This in turn requires that the slope of the load line be steeper than the slope of the negative resistance portion of the characteristics, as indicated in Fig. 8. This condition is easily secured with the apparatus of the invention, especially when a bias battery 5 of large positive potential is provided. The resulting oscillations may be locked in step with control pulses in well-known fashion.

Figure 4:
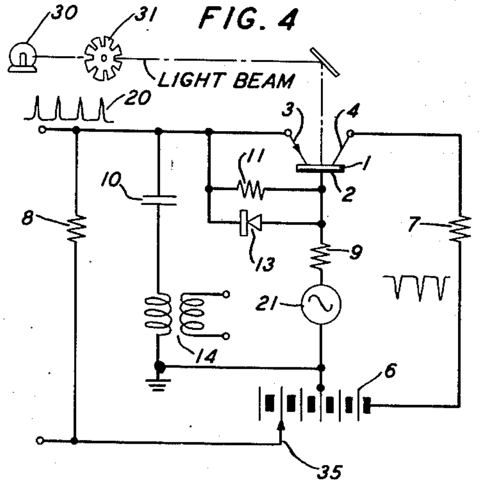
Fig. 4 is a schematic circuit diagram including the features of Figs. 1, 2, and 3.

In the case of monostable operation, the tripping pulses may be applied to the emitter positively or to the base negatively, as desired, and they may be derived from any desired source, such as a photocell. In addition, however, the system may be tripped without the use of any external electrical pulsing source merely by applying a flash of light, as from a light source 30 and chopper 31, to the surface of the transistor itself in the region of the emitter electrode. Trigger pulse of all three kinds are shown in Fig. 4, which also contains the various features discussed above in connection with Figs. 1, 2, and 3. In particular, a single battery 6 serves both to supply operating potential to the collector 4 and, by virtue of an adjustable tap 35, to adjust the potential of the intercept of the load line resistor 8 with the zero current axis to a negative value for monostable operation or to a positive value for astable operation.

Subject matter related to the foregoing is covered in Rack Patent 2,579,336, issued December 18, 1951.

What is claimed is:

1. An electrical trigger element which comprises a current-multiplication transistor having a semiconductive body and a base electrode, an emitter electrode and a collector electrode making contact with said body, an external network interconnecting said electrodes by way of which current is regeneratively fed back from the collector to the emitter, said network including a fixed potential point, a potential source interconnecting said fixed potential point and the collector, a feedback-promoting impedance element interconnecting the fixed potential point with the base, a reactive element interconnecting the emitter with the fixed potential point, and a reactance-discharging impedance element interconnecting the emitter with the base.

2. Apparatus as defined in claim 1, wherein the reactive element is a condenser.

3. Apparatus as defined in claim 1, wherein the last-named impedance element is a resistor whose magnitude is intermediate between that of the forward emitter contact resistance and that of the reverse emitter contact resistance.

4. Apparatus as defined in claim 1, wherein the last-named impedance element is a rectifier poled in such a direction that its resistance is high when the emitter voltage is small and vice versa.

5. Apparatus as defined in claim 1, wherein the last-named impedance element comprises the parallel combination of a rectifier and a resistor.

6. Apparatus as defined in claim 1, wherein the last-named impedance element is one whose impedance varies with the voltage impressed upon it about an average value which is intermediate that of the forward emitter contact resistance and that of the reverse emitter contact resistance when it is subjected to a voltage of average magnitude, being of lower impedance when subjected to a voltage which is larger than average in absolute magnitude and of higher impedance when subjected to a voltage which is smaller than average in absolute magnitude.

7. In combination with apparatus as defined in claim 1, a resistor of magnitude substantially larger than the reverse resistance of the emitter contact, one end of said resistor being connected to the emitter, and a source of potential, the positive terminal of said source being connected to the fixed potential point and its negative terminal being connected to the other end of said resistor.

8. An elecrical trigger element which comprises a current multiplification transistor having a semiconductive body and a base electrode, an emitter electrode and a collector electrode engaging said body, an external network interconnecting said electrodes by way of which current is regeneratively fed back from the collector electrode to the emitter electrode, said network including a fixed potential point, a potential source having two terminals connected, respectively, to said fixed potential point and to said collector electrode in a polarity to apply a reverse bias to said collector electrode, said source having also a third terminal, a feedback-promoting impedance element connected between said fixed potential point and said base electrode, and a resistor whose magnitude substantially exceeds the reverse resistance of the emitter contact connected between said third source terminal and the emitter electrode, said third terminal being located on said source in relation to the magnitude of said last-named resistor to apply a reverse bias potential to said emitter electrode.

9. An electrical trigger element which comprises a current multiplication transistor having a semiconductive body and a base electrode, an emitter electrode and a collector electrode engaging said body, an external network interconnecting said electrodes by way of which current is regeneratively fed back from the collector electrode to the emitter electrode, said network including a fixed potential point, a potential source having two terminals connected, respectively, to said fixed potential point and to said collector electrode in a polarity to apply a reverse bias to said collector electrode, said source having also a third terminal, a feedback-promoting impedance element connected between said fixed potential point and said base electrode, a condenser interconnecting said emitter electrode with said fixed potential point, and a resistor whose magnitude substantially exceeds the reverse resistance of the emitter contact connected between said third source terminal and the emitter electrode, said third terminal being located on said source in relation to the magnitude of said last-named resistor to apply a reverse bias potential to said emitter electrode.

10. An electrical trigger element which comprises a current multiplication transistor having a semiconductive body and a base electrode, an emitter electrode and a collector electrode engaging said body, an external network interconnecting said electrodes by way of which current is regeneratively fed back from the collector electrode to the emitter electrode, said network including a fixed potential point, a potential source having two terminals connected, respectively, to said fixed potential point and to said collector electrode in a polarity to apply a reverse bias to said collector electrode, said source having also a third terminal, a feedback-promoting impedance element connected between said fixed potential point and said base electrode, and a resistor whose magnitude substantially exceeds the reverse resistance of the emitter contact connected between said third source terminal and the emitter electrode, said third terminal being located on said source in relation to the magnitude of said last-named resistor to apply a reverse bias potential to said emitter electrode, and an impedance element interconnecting the emitter electrode with the base electrode, the magnitude of said last-named impedance element being intermediate between that of the forward emitter contact resistance and that of the reverse emitter contact resistance.

11. A self-oscillator which comprises a current multiplication transistor having a semiconductive body and and a base electrode, an emitter electrode and a collector electrode making contact with said body, an external network interconnecting said electrodes, said network including a fixed potential point, a positive feedback-promoting impedance element interconnecting the base with said fixed potential point, a condenser interconnecting said emitter with said fixed potential point, a potential source having two end terminals and an intermediate terminal, said intermediate terminal being connected to said fixed potential point, one of said end terminals being connected to said collector electrode to supply operating potential thereto, and a resistor whose magnitude is large compared with the reverse resistance of the emitter contact, one end of said resistor being connected to the other end terminal of said potential source, the other end of said resistor being connected to said emitter, whereby said source supplies a substantially constant current by way of said last-named resistor to said emitter and to said condenser in parallel.

12. A self-oscillator which comprises a current-multiplication transistor having a body of N-type semiconductive material and a base electrode, an emitter electrode and a collector electrode making contact with said body, an external network interconnecting said electrodes, said network including a fixed potential point, a positive feedback-promoting impedance element interconnecting the base electrode with said fixed potential point, a condenser interconnecting the emitter electrode with said fixed potential point, a potential source having a positive terminal, a negative terminal and a third terminal, said positive terminal being connected to said fixed potential point, said negative terminal being connected to said collector electrode to supply operating potential thereto, and a resistor interconnecting said third potential source terminal with said emitter electrode, the magnitude of said resistor being large compared with the reverse resistance of the emitter contact, whereby said source supplies a substantially constant current by way of said last-named resistor to said emitter electrode and to said condenser in parallel.

References Cited in the file of this patent

UNITED STATES PATENTS

| | | |
|---|---|---|
| 2,531,076 | Moore, Jr. | Nov. 21, 1950 |
| 2,533,001 | Eberhard | Dec. 5, 1950 |
| 2,541,322 | Barney | Feb. 13, 1951 |

OTHER REFERENCES

Review of Scientific Instruments, August 1949, pages 586–588, "A Transistor Trigger Circuit," by Reich and Ungvary.